Aug. 18, 1964  H. M. FOX  3,144,829
SOLID PROPELLANT CHARGE
Filed Dec. 16, 1958  3 Sheets-Sheet 1
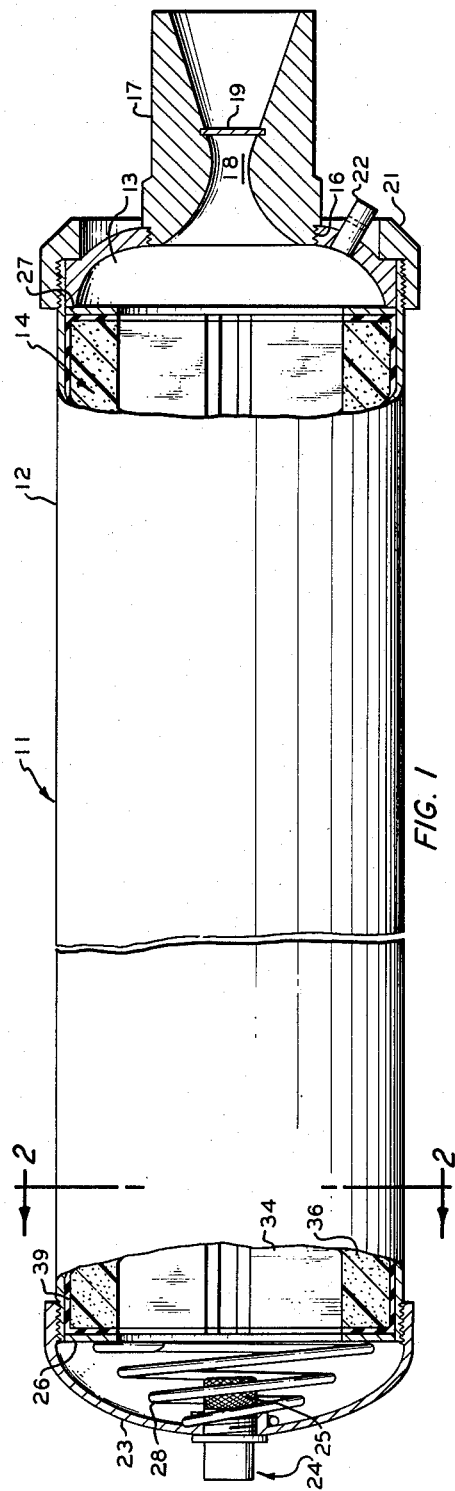
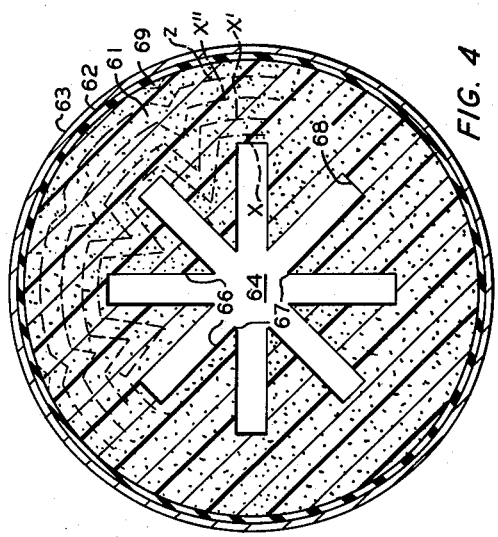
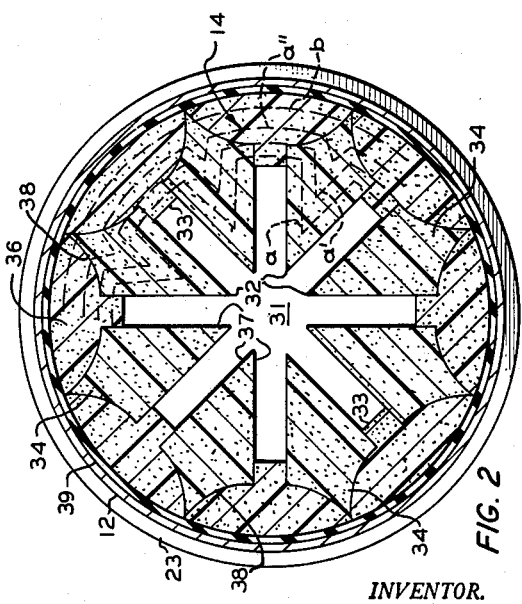
INVENTOR.
H.M. FOX
BY Hudson & Young
ATTORNEYS Aug. 18, 1964     H. M. FOX     3,144,829
SOLID PROPELLANT CHARGE
Filed Dec. 16, 1958     3 Sheets-Sheet 2
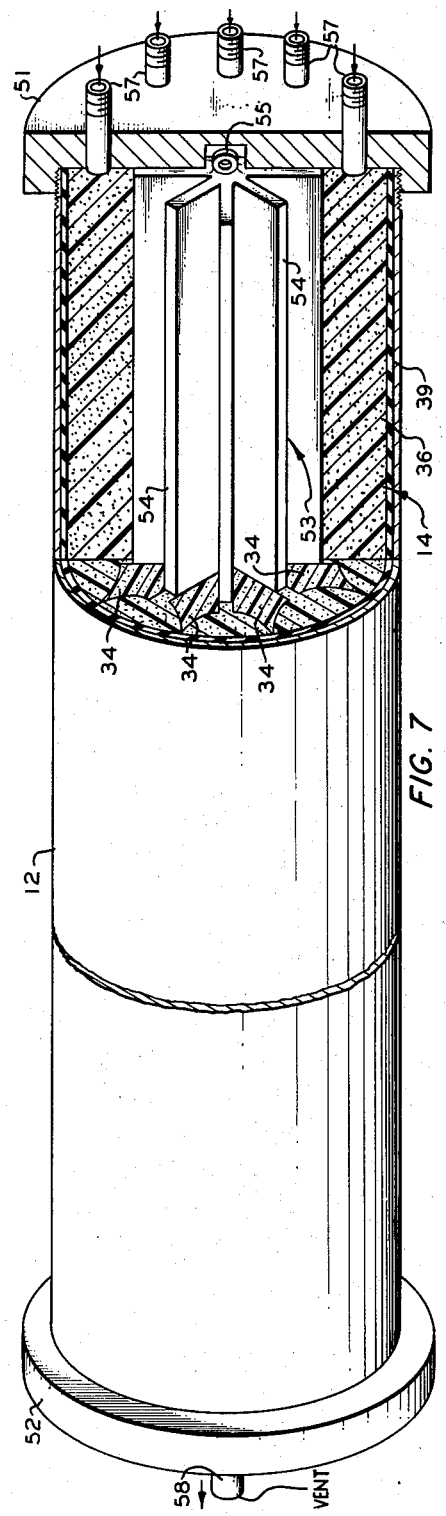
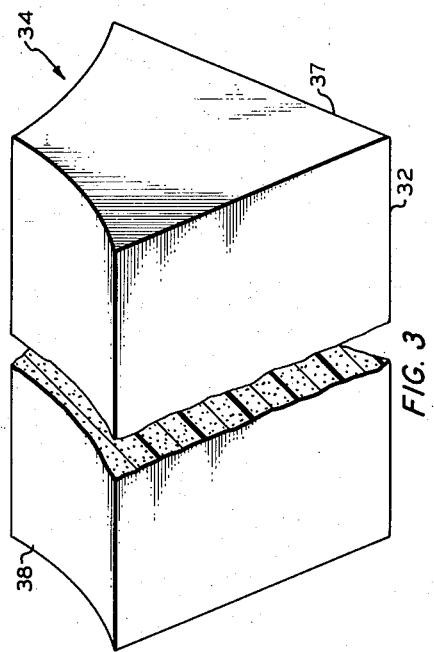
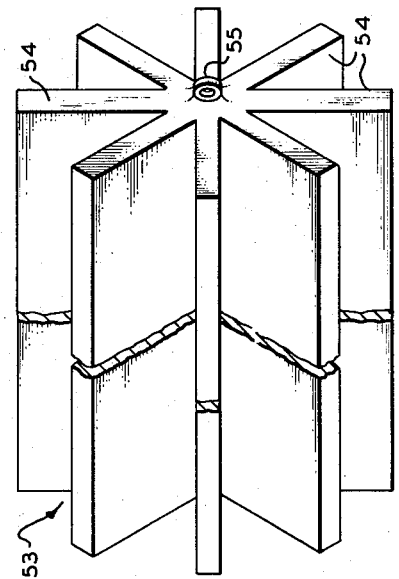
INVENTOR.
H. M. FOX
BY *Hudson & Young*
ATTORNEYS Aug. 18, 1964  H. M. FOX  3,144,829
SOLID PROPELLANT CHARGE
Filed Dec. 16, 1958  3 Sheets-Sheet 3

INVENTOR.
H.M. FOX
BY Hudson E. Young
ATTORNEYS

# United States Patent Office 3,144,829
Patented Aug. 18, 1964

3,144,829
SOLID PROPELLANT CHARGE
Homer M. Fox, Bartlesville, Okla., assignor to Phillips
Petroleum Company, a corporation of Delaware
Filed Dec. 16, 1958, Ser. No. 780,897
8 Claims. (Cl. 102—98)

This invention relates to a novel solid propellant charge. In one aspect, it relates to a solid propellant charge adapted for use in jet propulsion devices, such as missiles, gas generators, rocket motors, JATO units, and the like. In another aspect, it relates to jet propulsion devices of the type described, the combustion chambers of which are loaded with novel solid composite propellant charges comprising cast propellant and extruded or compression molded propellant.

In the past fifteen years or so, great interest developed in solid propellants for jet propulsion devices, such as missiles, rocket motors, gas generators, JATO units, and the like. One type of solid propellant which has received particular attention is that of the composite type, a typical composite propellant being one that uses an organic resin as the fuel and binder, and uses a solid oxidizer, such as ammonium nitrate. Solid composite propellants of the extrudable or compression molded type, rather than the castable propellant type, are often preferred because they have relatively higher impulses due to their higher oxidizer loading. A type of charge geometry which is often preferred is that of the internal-burning type, a typical charge of this nature being cylindrical with an axial perforation, commonly in the shape of a star, defining the internal burning surface. In this latter type of charge, the initial burning surface is relatively great as compared to the progressively generated burning surfaces during the consumption of the propellant.

One disadvantage of the perforated cylindrical charge of solid propellant resides in the fact that near the termination of the burning, or near burnout, small isolated slivers of unconsumed propellant are formed at a point in radial alignment with the inner extremities of the original axial perforation and adjacent the outer periphery of the charge. This phenomenon gives rise to some uncontrolled burning. With complex propellant charge geometry, such as that of the star type, it is often difficult to securely mount the charge within the combustion chamber of the rocket motor, particularly when the charge is made from propellant of the extruded type, and particularly if the charge is to be case bonded, i.e., if the outer cylindrical surface of the charge is to be bonded to the inner cylindrical wall defining the combustion chamber.

Accordingly, an object of this invention is to provide a novel solid propellant charge. Another object is to provide a novel solid propellant charge adapted for use in jet propulsion devices, such as missiles, gas generators, rocket motors, JATO units, and the like. Another object is to provide jet propulsion devices of this nature, such as JATO units, the combustion chambers of which are loaded with a novel solid composite propellant charge comprising cast propellant and extruded or compression molded propellant. Another object is to provide a novel solid propellant charge having a reduced tendency to form slivers or other isolated portions of unconsumed propellant near the burnout of the propellant. A further object is to provide a rocket motor having an improved case bonded propellant charge loaded within the combustion chamber thereof. Further objects and advantages of this invention will become apparent to those skilled in the art from the following discussion, appended claims, and accompanying drawing in which:

FIGURE 1 is a longitudinal view in elevation and partial section of a jet propulsion device the combustion chamber of which is loaded with the novel solid propellant charge of this invention;

FIGURE 2 is a cross-sectional view of FIGURE 1 taken along the plane indicated;

FIGURE 3 is an isometric view, in partial section, of a typical grain or segment of propellant used in assembling the propellant charge illustrated in FIGURES 1 and 2;

FIGURE 4 is a cross-sectional view similar to that of FIGURE 2 illustrating the cross section of a rocket motor loaded with a conventional star perforated propellant charge;

FIGURE 7 is an isometric view in partial section of a rocket motor casing being loaded with the solid propellant charge of FIGURES 1 and 2; and FIGURE 8 is an isometric view of a mandrel such as shown in FIGURE 7.

Figure 5:
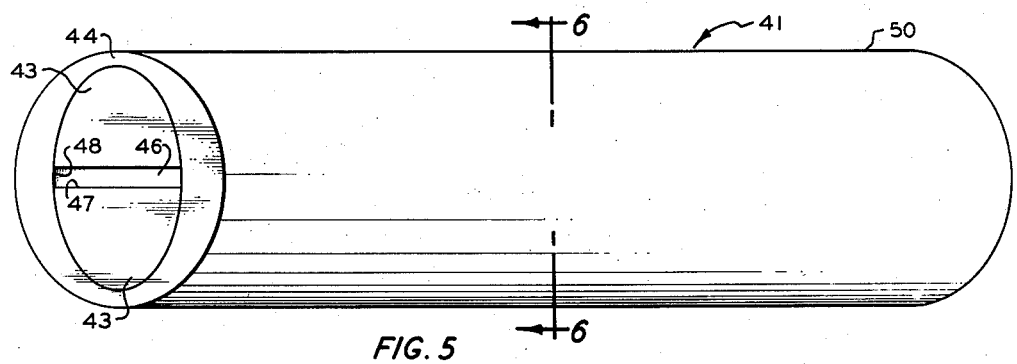
FIGURE 5 is an isometric view of another embodiment of the solid propellant charge of this invention.

Referring now to the drawing, in which like reference numbers have been used to designate like parts, and initially to FIGURES 1 and 2, there is illustrated a rocket motor generally designated 11. Rocket motor 11 comprises a tubular or cylindrical casing 12, made of metal or the like, which defines a cylindrical combustion chamber 13 in which is loaded a solid propellant charge 14 of this invention. The aft end of the rocket motor 11 is provided with an axial opening 16 in which is positioned a reaction nozzle 17 of the De Laval type having an axial converging-diverging passage 18 which communicates at its inlet end with combustion chamber 13. Disposed across passage 18 is a conventional obturating member or starter disc 19 which is adapted to function, for example by rupturing, when a predetermined pressure is built up within combustion chamber 13. Nozzle 17 can be secured to the aft end of casing 12 by means of a suitable locking ring 21. The aft portion of the rocket motor casing is reduced and is provided with one or more conventional safety plug attachments 22 adapted to function when an excessive pressure is built up within the combustion chamber 13, in a manner well known in the art. The head end of the rocket motor casing 12 is closed by a suitable closure member 23 which also is provided with an axial opening in which is threadedly secured an igniter assembly 24 having a frangible cup or container 25 filled with ignition material, such as black powder or other pyrotechnic material, which can be ignited by suitable electro-responsive means, such as squibs, matches, or the like, upon connecting the igniter device to a suitable external power source. A preferred igniter assembly is that disclosed in copending application Serial No. 591,340, filed June 14, 1958, by B. R. Adelman. The ends of propellant charge 14 can be supported within the combustion chamber 13 of rocket motor 11 by any suitable fashion, such as that shown in the drawing. For example, suitable annular metal plates 26, 27 can be secured to both ends of the charge 14, the aft retaining plate 27 abutting a suitable shoulder or flange defined by the inner wall of the casing 12 and a suitable compression spring 28 disposed within the head end of the combustion chamber between the closure member 23 and head retaining plate 26.

The solid propellant charge 14 is provided with an axial perforation 31, extending the length thereof, the cross-sectional area of the initial perforation being smaller than that of the throat of the nozzle passage 18. The particular perforation 31 shown in the drawing has the shape of a star in cross section, having inner extremities or inner star points 32 and outer extremities or outer star points 33. The number of star points can vary, e.g., up to 5, 6, 7, etc. The propellant charge 14 is made up of two different propellant compositions or types, solid extruded or compression molded solid propellant 34 and solid cast propellant 36. The main portion of the perforation 31 is defined by the internal exposed surfaces 37 of a plurality of circumferentially arranged, non-contiguous, longitudinally-extending segments of extruded propellant 34, the particular segments being shown in the drawing having a cross section in the shape of a diamond (see FIGURE 3). The outer extremities of perforation 31, such as outer star points 33, are defined by the internal, exposed burning surfaces of the cast propellant 36, the outer surfaces 38 of extruded propellant segments 34 being contiguous with this cast propellant. By reason of this configuration, the extruded propellant segments 34 are spacially supported by the cast propellant 36 which is case-bonded by a suitable slow-burning or noncombustible adhesive or rubbery liner 39 to the internal cylindrical wall of the rocket motor casing 12. The ends of propellant charge 14 can also be covered by material 39 so as to limit the ignition and subsequent burning of the propellant material to those surfaces defining the internal perforation 31.

Figure 6:
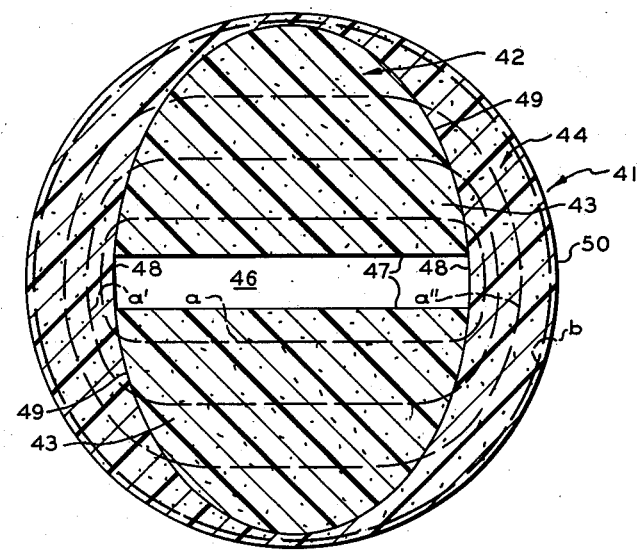
FIGURE 6 is a cross-sectional view of FIGURE 5 taken along the plane indicated.

Referring now to FIGURES 5 and 6, a cylindrical propellant charge 41 is shown, comprising solid extruded or compression molded propellant material 43 and cast propellant material 44. Propellant charge 41 has an axial perforation 46, substantially rectangular in cross section, which is defined in the main by the internal exposed surfaces 47 of extruded propellant segments 43. The outer extremities of the perforation 46 are defined by the exposed burning surfaces 48 of the cast propellant material 44. The extruded segments 43 are hemi-elliptical in cross section and their outer surfaces 49 are contiguous with the cast propellant material 44, thereby supporting segments 43. The outer cylindrical surface 50 of propellant charge 41 and the both ends of the charge can be covered with burning restricting material, such as restricting material 39 of FIGURES 1, 2, and the charge 41 loaded within the combustion chamber of a rocket motor in the manner as that shown in FIGURES 1 and 2.

It should be evident from the foregoing discussion that the propellant charges of this invention can have perforations of rather simple design, such as that shown in FIGURES 5 and 6, or relatively complex and intricate designs and shapes such as that illustrated in FIGURES 1 and 2.

A suitable method for assembling the propellant charge of this invention is shown in FIGURES 7 and 8. In FIGURE 7, the threaded ends of rocket motor casing 12 are threadedly secured to mold closure plates 51, 52. Plate 52 is first threadedly secured to the head end of casing 12 during the initial part of the charge assembly procedure. During the charge assembly procedure, the casing 12 is preferably placed in a vertical position. Before mandrel 53 is positioned within the casing 12, a plurality of extruded propellant segments 34 (which can be partially cured) are disposed between the radiating arms 54 of the mandrel, the latter having the same configuration as that of the final perforation, such as perforation 31 of FIGURES 1 and 2. The extruded segments 34 can be secured about the mandrel by any simple means, for example, by wrapping a light steel tape around the extruded segments 34 while they are in position around the mandrel. When thus assembled, the loaded mandrel can be disposed within the rocket motor casing 12, for example, by lowering the assembly by means of ring 55, and permitting the assembly to stand upright on the inner face of plate 52. In some cases it may be desirable to form in the inner face of plate 52 a shallow depression having the same shape as the cross section of mandrel 53 so that the latter will stand upright and be supported by plate 52.

Aft plate 51 is provided with a plurality of injection inlet pipes 57 for the castable propellant, these inlet pipes being circumferentially oriented in longitudinal alignment with the radiating arms 54 of mandrel 53. With the aft plate 51 in position, the castable propellant is then injected under pressure into the rocket motor casing 12 by injection inlet pipes 57, the excess castable propellant being released from the rocket motor casing via a suitable vent or excess flow pipe 58 fixed in the head plate 52 at a point in longitudinal alignment with one of the radiating arms 54 of mandrel 53. After sufficient castable propellant material 36 is injected into the rocket motor casing 12, the propellant materials in the assembly can then be cured, for example in a circulating air oven, at a suitable temperature, for example at 70 to 250° F. for 24 hours or longer. After the propellant materials 34, 36 are cured, the head mold plate 51 is removed from the aft end of the rocket motor casing 12 and mandrel 53 is removed by pulling upwardly on ring 55. The removal of the mandrel 53 can be aided by preliminarily coating the same with a suitable mold release substance, such as a halogen-containing polymer, e.g., Teflon, this mold release substance preventing the extruded and cast propellant portions from sticking to the mandrel. Thereafter, the ends of the propellant charge 14 can be covered with suitable restricting material, such as 39 in FIGURES 1 and 2, and the other rocket motor appurtenances affixed to the rocket motor casing, such as closure member 23, igniter assembly 24, grain retaining plates 26, 27, compression spring 28, nozzle 17, and safety plug 22.

In the operation of the rocket motor shown in FIGURES 1 and 2, the motor is armed by removing the outer cap from the igniter assembly 24 and connecting a suitable electrical plug therein to an external power source, such as a battery. Upon closing a suitable switch, electrical current sets off the electro-responsive member in contact with the black powder or other pyrotechnic material in the frangible container 25 disposed within the head end of the rocket motor combustion chamber 13. As a result, the igniter material ignites and the resulting hot products of ignition are generated, causing the failure of the frangible igniter cup with the result that the hot products immediately propagate within the combustion chamber, these hot products being preferably directed down the axial perforation 31 of the propellant charge 14. Thereafter, the heat is transferred from the hot ignition products to the exposed burning surfaces 37, 33 of the propellant charge, raising the same to an ignition temperature. The propellant materials 34, 36 subsequently begin to burn and generate gaseous products of combustion, raising the pressure within the combustion chamber 13. When a predetermined bursting pressure is reached, the starter disc 19 functions to provide a means of escape for the propellant combustion gases, these gases flowing at a high velocity through the now open nozzle passage 18, thereby imparting thrust to the rocket motor 11.

The propellan materials of charge 14 burn in relatively parallel layers, as is well known in the art. Since the extrued propellant 34 has a higher burning rate than that of the cast propellant 36, the former propellant material will burn faster or at a more rapid rate than that of the latter. Since the extruded propellant is mechanically stonger than that of the cast propellant, the inner star points, defining in the main the initial burning surface, will have greater strength during ignition and burning than they would have had they been made of the cast propellant.

The progressively generated burning surfaces are schematically shown by the broken lines designated a, a', a'' and b. Note that the progressively generated burning surfaces a, a', a'' are defined by alternating or circumferenitally spaced peaks or cusps radially opposite the initial inner star points 32 and valleys or dips radially opposite the outer star points 33. The peaks or cusps of the progressively generated burning surfaces become progressively less pronounced until they are almost completely absent. Near the termination of burning or near burnout (i.e., at that point in the burning cycle when substantially all of the propellant has been consumed) the progessively generated burning surface, as representative by $b$, is practically completely cylindrical. This mode of burning is due to the configuration shown and the propellant materials employed, the progressively generated burning surfaces "leveling out." As a result, the tendency for slivers of propellant to form near the termination of burning is minimized or substantially lessened. This type of burning can be distinguished from that of a conventional solid propellant charge having an internal burning surface in the shape of a star by reference to FIGURE 4 wherein such a conventional charge is shown. Charge 61 as shown in FIGURE 4 is cylindrical in shape and has its outer cylindrical surface bonded by means of adhesive 62 or the like to the internal cylindrical wall of rocket motor casing 63. Charge 61 has an axial perforation 64 defined by burning surface 66, the perforation having inner star points 67 and outer star points 68. The propellant material employed in charge 61 can be any composite propellant, such as that of the extrudable or compression molded type or the castable propellant type. Although the first or initial progressively generated burning surfaces $x$, $x'$, $x''$ are similar to the corresponding progressively generated burning surfaces $a$, $a'$, $a''$ of FIGURE 2, near the burnout of charge 61 of FIGURE 4, the burning surface $z$ still has cusps and valleys and small longitudinal slivers 69 of propellant remain, this leading to uncontrolled burning.

Rocket motors loaded with the propellant charge 41 shown in FIGURES 5 and 6 are similarly fired, the initial ignition of the propellant material taking place on exposed surfaces 47, 48 defining the axial perforation 46. Here again, the propellant material 43 burns at a faster rate than that of propellant material 44. The progressively generated burning surfaces $a$, $a'$, $a''$ and $b$ of propellant charge 41 gradually become more and more concentric until near the termination of the burning, as representative by progressively generated burning surface $b$, the burning surface is practically completely cylindrical, slivers of propellant at this point being absent.

The rocket motor and process for preparing it which has been described herein has a number of advantages. It is possible to obtain a higher specific impulse for the motors described herein than would be possible with a motor of similar grain design which was formed from castable propellant only. The propellant grain of the motor of the present invention is mechanically more stable than similar designs for castable propellants, and the rocket motor of the present invention will exhibit sliverless burning. The process as described herein also offers the advantage that smaller batches of propellant are required for the production of large rocket motors, thus relaxing the need for long pot life. The rocket motor and the method for producing it as described herein also offers several advantages over motors prepared solely by extrusion, that is, motors in which both propellants are of the extrudable type. In motors utilizing only extrudable propellant, hand loading is widely used. The present process practically eliminates the building up of large grains by hand. The use of the combination of the extrudable and castable propellant in the present invention gives better bonding of the propellant to the case. The rocket motor of the present invention also gives a high volumetric loading. Other advantages and embodiments of this invention should be obvious to those skilled in the art.

In addition to the advantages of this invention discussed hereinbefore, one other advantage is readily apparent. Due to shrinkage during curing, solid rocket motors develop stresses which tend to pull the grain away from the walls of the rocket motor casing. These stresses are directly proportional to the curing temperature. The extruded portion of the rocket motor of this invention can be partially cured at the fairly high curing temperature required for the extruded grains, while the castable material can be cured at a lower temperature. Since this final cure takes place after loading the partially cured extruded grains into the casing, the lower temperature also serves to finish the cure of the extruded grains. This is particularly true for the polyurethane castable propellants. The rate of cure, cure temperature and the degree of curing can be controlled by regulating the proportion of ingredients, particularly the diisocyanate, in the polyurethane recipe.

The extrudable solid propellant material employed in fabricating the propellant charges of this invention can be any of those known in the art, and comprise a major amount of a solid inorganic oxidizing salt, such as ammonium nitrate, and a minor amount of a rubbery binder material, such as a copolymer of 1,3-butadiene and 2-methyl-5-vinylpyridine.

Particular suitable extrudable solid propellant compositions which may be employed are those disclosed and claimed in copending applications Serial No. 284,447, filed April 25, 1952, and Serial No. 561,943, filed January 27, 1956, both by W. B. Reynolds et al. The propellant compositions disclosed in these copending applications comprise a solid inorganic oxidizer, and a binder formed by polymerizing a vinyl-substituted heterocyclic nitrogen base compound with an open chain conjugated diene. The following empirical formulas or recipes generally represent the class of extruded solid propellant compositions preferred for the preparation of the propellant charge of this invention.

TABLE I

| Ingredient | Parts per 100 Parts of Rubber | Parts by Weight |
|---|---|---|
| Binder | | 5-50 |
| Copolymer (Bd/MVP) | 100 | |
| Philblack A (a furnace black) | 10-30 | |
| Plasticizer | 10-30 | |
| Silica | 0-20 | |
| Metal Oxide | 0-5 | |
| Antioxidant | 0-5 | |
| Wetting Agent | 0-2 | |
| Accelerator | 0-2 | |
| Sulfur | 0-2 | |
| Oxidizer (Ammonium Nitrate) | | 50-95 |
| Burning Rate Catalyst | | 2-30 |

The polymerizable heterocyclic nitrogen bases which are applicable for the production of polymeric binder materials are those having a vinyl group,

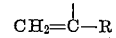

where R is either hydrogen or a methyl group, and are copolymerizable with a conjugated diene. Substituted heterocyclic nitrogen base compounds particularly useful are those selected from the group consisting of pyridine, quinoline, alkyl substituted pyridine and an alkyl substituted quinoline, where the total number of carbon atoms in the nuclear alkyl substituents is not more than 15. Of these, the compounds of the pyridine series are of the greatest commercial interest at present. The preferred, readily available binder employed is a copolymer prepared from 90 parts by weight of butadiene and 10 parts by weight of 2-methyl-5-vinylpyridine, hereinafter abbreviated Bd/MVP. This copolymer is polymerized to a Mooney (ML-4) plasticity value in the range of 10-40, preferably in the range of 15 to 25.

These heterocyclic nitrogen bases can be represented by the following structural formulas:

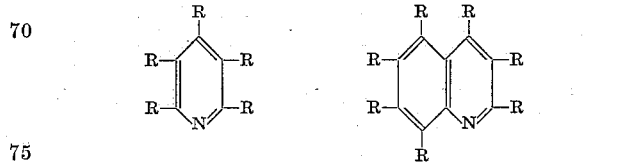

or

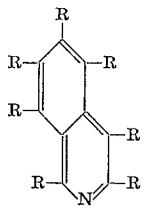

where R is selected from the group consisting of hydrogen, alkyl, vinyl, alpha-methylvinyl, alkoxy, halo, hydroxy, cyano, aryloxy, aryl, and combinations of these groups such as haloalkyl, alkylaryl, hydroxyaryl, and the like; one and only one of said groups being selected from the group consisting of vinyl and alpha-methylvinyl; and the total number of carbon atoms in the nuclear substituted groups being not greater than 15. Examples of such compounds are 2-vinylpyridine; 2-vinyl-5-ethylpyridine; 2-methyl-5-vinylpyridine; 4-vinylpyridine; 2,3,4-trimethyl-5-vinylpyridine; 3,4,5,6 - tetramethyl-2-vinylpyridine; 3 - ethyl - 5-vinylpyridine; 2,6-diethyl-4-vinylpyridine; 2-isopropyl-4-nonyl-5-vinylpyridine; 2-methyl-5-undecyl-3-vinylpyridine; 2,4-dimethyl-5,6-dipentyl-3-vinylpyridine; 2-decyl-5-(alpha-methylvinyl)pyridine; 2-vinyl-3-methyl-5-ethylpyridine; 2-methoxy-4-chloro-6-vinylpyridine; 3-vinyl-5-ethoxypyridine; 2-vinyl-4,5-dichloropyridine; 2-(alpha-methylvinyl)-4-hydroxy-6-cyanopyridine; 2-vinyl-4-phenoxy-5-methylpyridine; 2-cyano-5-(alpha-methylvinyl)pyridine; 3-vinyl-5-phenylpyridine; 2-(para-methylphenyl)-3-vinyl-4-methylpyridine; 3-vinyl-5-(hydroxyphenyl)-pyridine; 2-vinylquinoline; 2-vinyl-4-ethylquinoline; 3-vinyl-6,7-di-n-propylquinoline; 2-methyl-4-nonyl-6-vinylquinoline; 4(alpha-methylvinyl)-8-dodecylquinoline; 3-vinylisoquinoline; 1,6-dimethyl-3-vinylisoquinoline; 2-vinyl-4-benzylquinoline; 3-vinyl-5-chloroethylquinoline 3-vinyl-5,6-dichloroisoquinoline; 2-vinyl-6-ethoxy-7-methylquinoline; 3 - vinyl-6-hydroxymethylisoquinoline; and the like.

The conjugated dienes employed in preparing the rubbery copolymer materials which are utilized as binders are preferably those containing from 4 to 8 carbon atoms per molecule. Representative conjugated dienes which can be employed include 1,3-butadiene, isoprene, 2-methyl-1,3-butadiene, 2,3-dimethyl-1,3-butadiene, piperylene, methylpentadiene, chloroprene, and the like. Various alkoxy derivatives, such as methoxy and ethoxy, and cyano derivatives of these conjugated dienes are also applicable, such as phenylbutadiene, 2,3-dimethyl-1,3-hexadiene, 2-methoxy-3-ethylbutadiene, 2-ethoxy-3-ethyl-1,3-hexadiene, 2-cyano-1,3-butadiene, and the like. Instead of using a single conjugated diene, a mixture of conjugated dienes can also be employed, such as a mixture of 1,3-butadiene and isoprene.

Oxidizers which are applicable in the solid rocket fuel compositions of this invention include ammonium, alkali metal, and alkaline earth metal salts of nitric, perchloric, and chloric acids, and mixtures thereof. Ammonium nitrate and ammonium perchlorate are the preferred oxidizers for use in the solid rocket fuels of this invention. Specific oxidizers include sodium nitrate, potassium perchlorate, lithium chlorate, calcium nitrate, barium perchlorate, and strontium chlorate. Mixtures of oxidizers are also applicable. In the preparation of the solid rocket fuel compositions, the oxidizers are powdered to sizes preferably 10 to 300 microns average particle size. The amount of solid oxidizer employed is usually a major amount of the total composition and is generally in the range between 50 and 90 percent by weight of the total mixture of oxidizer and binder. If desired, however, less than 50 percent by weight of the oxidizer can be used.

Suitable plasticizers useful in preparing these propellant grains include TP–90–B (dibutoxyethoxyethyl formal supplied by Thiokol Corporation); benzophenone; and Pentaryl A (monoamylbiphenyl). Suitable silica preparations include a 10–20 micron size range supplied by Davison Chemical Company; and Hi-Sil 202, a rubber grade material supplied by Columbia-Southern Chemical Corporation. A suitable antioxidant is Flexamine, a physical mixture containing 25 percent of a complex diarylamine-ketone reaction product and 35 percent of N,N'-diphenyl-p-phenylenediamine, supplied by Naugatuck Chemical Corporation. A suitable wetting agent is Aerosol-OT (dioctyl sodium sulfosuccinate, supplied by American Cyanamid Company). Satisfactory rubber cure accelerators include Philcure 113 (N,N-dimethyl-S-tertiary butylsulfenyl dithiocarbamate); Butyl-8 (a dithiocarbamate-type rubber accelerator supplied by R. T. Vanderbilt Company); and GMF (quinone dioxime, supplied by Naugatuck Chemical Company).

Suitable metal oxides include zinc oxide, magnesium oxide, iron oxide, chromium oxide, or combination of these metal oxides. Suitable burning rate catalysts include ferrocyanides sold under various trade names such as Prussian blue, steel blue, bronze blue, Milori blue, Turnbull's blue, Chinese blue, new blue, Antwerp blue, mineral blue, Paris blue, Berlin blue, Erlanger blue, foxglove blue, Hamberg blue, laundry blue, washing blue, Williamson blue, and the like.

Reinforcing agents include carbon black, wood flour, lignin, and various reinforcing resins such as styrene-divinylbenzene, methyl acrylate-divinylbenzene, acrylic acid-styrene-divinylbenzene, and methyl acrylate-acrylic acid-divinylbenzene resins. The reinforcing agent is usually used in an amount in the range of 10 to 50 parts by weight per hundred parts by weight of copolymer. The reinforcing agent can be omitted if desired.

High energy additives such as finely divided aluminum, magnesium, boron and other finely divided metals can also be used in the propellant compositions of the invention. Said finely divided metals will usually have a particle size within the range of 1 to 50 microns and will usually be used in amounts within the range of 1 to 50 microns and will usually be used in amounts within the range of 0 to 20 weight percent based on the total propellant composition.

It is to be understood that each of the various types of compounding ingredients can be used singly, or mixtures of various ingredients performing a certain function can be employed. It is sometimes preferred, for example, to use mixtures of plasticizers rather than a single material.

The binder forms a continuous phase in the propellant with the oxidant as the discontinuous phase. One procedure for blending the propellant ingredients utilizes a stepwise addition of oxidant and other dry ingredients to the binder mixture. The binder ingredients are mixed to form a binder mixture, and the oxidizer ingredient is then added to said binder mixture in equal subsequent additions, usually four or more.

The castable propellant compositions which can be employed in preparing the propellant charges of this invention are made by mixing the oxidizer into a curable liquid binder to form a mixture which will set up to a solid material upon curing. The oxidizers which can be employed are the same as those disclosed hereinbefore in the preparation of the extrudable solid propellant compositions, ammonium perchlorate being preferred. Suitable binder materials which can be employed in preparing these castable propellants include cellulose, acrylic, epoxy, phenolic, polyamide, polyester, polyethylene, polysulfide rubbers (e.g., Thiokol), polyurethane, polybutadiene, polyvinyl, and like materials. Polyurethanes are the preferred binders of these castable propellant compositions and can be prepared by the interaction of a polyisocyanate with an active hydrogen-containing compound selected from the group consisting of aliphatic saturated and unsaturated polyhydroxy compounds and polyamino compounds containing at least one active hydrogen atom. Said polyurethane monomers are usually reacted in substantially stiochiometric amounts. However, said active hydrogen-containing compound can be used in amounts up to 15 weight percent in excess of stoichiometric and said diisocyanate can be used in amounts up to 25 weight percent in excess of stoichiometric.

While organic polyisocyanates in general can be used in the practice of this invention, the diisocyanates are preferred because of their availability and ease of preparation. Said polyisocyanates should be liquid under the conditions of use. Representative polyisocyanates include, among others, the following: benzene-1,3-diisocyanate, benzene-1,4-diisocyanate, hexamethylene diisocyanate, toluene-2,4-diisocyanate, toluene-2,5-diisocyanate, diphenylmethane-4,4'-diisocyanate, diphenyl - 4,4' - diisocyanate, diphenyl - 3,3' - dimethyl - 4,4' - diisocyanate, 2-chloropropane-1,3-diisocyanate, diphenyl-3,3'-dimethoxy-4,4' - diisocyanate, naphthalene-1,5-diisocyanate, pentamethylenediisocyanate, tetramethylenediisocyanate, octamethylenediisocyanate, ethylenediisocyanate, propylene-1,2 - diisocyanate, benzene - 1,2,4 - triisocyanate, toluene-2,3-diisocyanate, diphenyl-2,2'-diisocyanate, naphthalene-2,7 - diisocyanate, naphthalene-1,8-diisocyanate, toluene-2,4,6-triisocyanate, benzene-1,3,5-triisocyanate, benzene-1,2,3-triisocyanate, and toluene-2,3,4-triisocyanate.

Active hydrogen-containing compounds which can be used in the practice of the invention include those which have plasticizing properties and which are known to react with polyisocyanates to form polyurethanes. Compounds which are useful for this purpose in the practice of the invention are those which contain hydroxyl and/or amino groups, each of said amino groups containing at least one active hydrogen atom, and which are reactive with an isocyanate group, —NCO. Compounds employed have two or more of said reactive hydrogen-containing groups in the molecule. Commonly, the preferred compounds are glycols and hydroxy containing esters, including polyglycols and polyesters. Polyamino compounds including diamines such as putrescine and cadaverine can also be employed. Triols such as glycerol and tetrols such as erythritol can also be used. Natural products which are particularly useful include castor oil, which comprises a glyceride of ricinoleic acid, and recinoleyl alcohol, and mixtures thereof. Said active hydrogen containing compounds should be liquid under the conditions of use defined above.

Other examples of these active hydrogen containing compounds include alkylene glycols such as ethylene glycol, diethylene glycol, tetraethylene glycol, neopentyl glycol, compounds designated as polyethylene glycol and polypropylene glycol having a molecular weight as high as 10,000 and even higher, propylene glycol, dipropylene glycol, mixed glycols such as the ethylene-propylene glycols, butylene glycol, dibutylene glycol, pentamethylene glycol, ricinoleyl alcohol, pentaerythritol [2,2-bis(hydroxymethyl)-1,3-propanediol], esters containing two or more OH groups, and the like. The esters can be made by reaction of dicarboxylic acids with glycols. Acids which can be used in the preparation of these esters include adipic, sebacic, succinic, phthalic and ricinoleic. These acids can be reacted with the above-described glycols to give esters of relatively low (e.g., 200–500) to relatively high (10,000 and even higher) molecular weight. Various methods for the preparation of these esters are known. For example, the acid and glycol can be reacted at an acid to glycol mol ratio between 0.5 and 2 under conditions to promote elimination of the water produced by the reaction. Still another method involves alternate additions of dicarboxylic acid and of glycol.

Still other examples of the active hydrogen containing compounds are ethanolamine, diethanolamine, isopropanolamine, diisopropanolamine, ethanolisopropanolamine, dibutanolamine, ethanolbutanolamine, ethylenediamine, diethylenetriamine, triethylenetetramine, tetraethylenepentamine, propylenediamine, dipropylenetriamine, hexamethylenediamine, heptamethylenediamine, 2,3 - dimethyl - 1,6 - diaminohexane, 4,6-diethyl-1,5,8-triaminoctane, 3,9-dimethyl-4,8-diisiobutyl-1,6,11-triaminoundecane, 1,5 - diamino - 2 - pentene, 1,6-dimethyl-1,7-diamino-4-heptene, and 2,7,8 - trimethyl - 1,6,10 - triamino-3-decene.

The binder contains polyurethanes of the type hereinbefore described and, in addition, there may be present one or more plasticizers, wetting agents, antioxidants and curing catalysts. The finished binder frequently contains various compounding ingredients. Thus, it will be understood that herein and in the claims, unless otherwise specified, the term "binder" is employed generically and includes various conventional compounding ingredients. The binder content of the total propellant composition will usually range from 10 to 50 percent by weight.

In general, any rubber plasticizer which is compatible with the polyurethanes can be employed in these binder compositions. Materials such as dioctyl sebacate; di(1,4,7-trioxaundecyl)methane; di(3,6-dioxadecyl)formal (TP–90B); and dioctyl phthalate are suitable plasticizers. Materials which provide rubber having good low temperature properties are preferred.

Wetting agents aid in deflocculating or dispersing the oxidizer, Aerosol OT (dioctyl ester of sodium sulfosuccinic acid), lecithin, and Duomeen C diacetate (the diacetate of trimethylene diamine substituted by a coconut oil product) are among the materials which are applicable.

Antioxidants include Flexamine (physical mixture containing 65 percent of a complex diarylamine-ketone reaction product and 35 percent of N,N'-diphenyl-p-phenylenediamine), phenyl-beta-naphthylamine, 2,2 - methylene-bis(4-methyl - 6 - tert-butylphenol), and the like. Rubber antioxidants, in general, can be employed or if desired can be omitted.

In addition, these castable propellant compositions can contain the same burning rate catalyst disclosed hereinbefore in the preparation of the extrudable solid propellant compositions. The aforementioned high energy additives such as finely divided aluminum, etc., can also be added to the castable propellant compositions.

One presently preferred and convenient method of preparing the castable propellant compositions of the invention comprises blending a solid inorganic oxidizing salt with a highly halogenated organic compound so as to coat said salt with said halogenated compound and form a first mixture. Said first mixture is then blended with an active hydrogen-containing compound to form a second mixture which is then blended with a polyisocyanate in an amount sufficient to interact with said active hydrogen-containing compound and form a polyurethane. Other variations in the mixing procedure can be introduced. In some instances all of the ingredients except the polyisocyanate can be blended in one operation and the polyisocyanate is then added. It is even possible with some polyisocyanates to incorporate them with the rest of the ingredients rather than waiting until all of the other ingredients are thoroughly blended.

Specific castable propellant compositions or recipes which can be used are those set forth in Table II.

TABLE II

| | Weight percent |
|---|---|
| Binder | 10–50 |
|     Polyurethane | 10–50 |
|     Plasticizer | 0–15 |
|     Antioxidant | 0–5 |
|     Surface active agent | 0–5 |
|     Curing catalyst | 0–1 |
| Highly halogenated organic compound | 0.15–5 |
| Oxidizer | 50–90 |
| Burning rate catalyst | 0–10 |
| Finely divided metal | 0–20 |

The following example is set forth to further illustrate the subject invention, and it should be understood that the ingredients, amounts, temperatures, etc., of this example represent a preferred and illustrative embodiment of this invention and should not be construed as unduly limiting this invention.

An extrudable propellant of the following formulation is made up by mixing the listed ingredients together in the amounts shown in a Banbury mixer and thereafter extruding the mixture into 12 inch elongated propellant grains essentially hemi elliptical in cross-section, such as that shown in FIGURES 5 and 6.

TABLE III

*Extruded Propellant Composition*

| Ingredient: | Parts by weight |
|---|---|
| Ammonium perchlorate | 78.00 |
| Aluminum powder | 7.50 |
| Rubbery copolymer [a] | 9.23 |
| Medium abrasion furnace black | 2.03 |
| Antioxidant [b] | 0.28 |
| Liquid polybutadiene [c] | 2.30 |
| Para-quinone dioxime | 0.20 |
| Burning rate catalyst [d] | 0.46 |

[a] 90/10 copolymer of 1,3-butadiene/2-methyl-5-vinylpyridine, prepared by emulsion polymerization.
[b] Physical mixture containing 65 weight percent of a complex diarylamine-ketone reaction product and 35 weight percent of N,N'-diphenyl-p-phenylenediamine.
[c] Liquid polymer of butadiene, prepared by sodium-catalyzed mass polymerization in n-heptane, and having a Saybolt Furol viscosity of approximately 2500 seconds at 100° F. The preparation of this polymer is described in U.S. 2,631,175.
[d] Harshaw catalyst Cu 0202, commonly referred to as copper chromite.

The above propellant composition is then cured at 170° F. for 48 hours. The ballistic properties of this cured propellant are as follows:

TABLE IV

*Ballistic Properties of Extruded Propellant*

| | |
|---|---|
| Specific impulse _____sec. | 249 |
| Characteristic exhaust velocity _____ft./sec. | 5060 |
| Burning rate at 1000 p.s.i. _____in./sec. | 0.76 |
| Pressure exponent | 0.29 |
| Propellent density _____ lbs./in.³ | 0.635 |
| Thrust coefficient at 1000 p.s.i. to sea level | 1.58 |

Two of these extruded grains are then loaded into a rocket motor casing of 5 inches I.D. with the aid of a rectangular mandrel 3.36" x 0.202" in dimension. The volume of the casing not filled by the mandrel and extruded propellant grains is then filled with castable propellant of the following composition.

TABLE V

*Castable Propellant Formulation*

| | Parts by weight |
|---|---|
| Ammonium perchlorate | 80.00 |
| 90/10 block polymer of propylene oxide/ethylene oxide (mol wt. approx. 1670) | 16.22 |
| N,N,N',N'-tetrakis-2-hydroxypropylethylene diamine | 0.94 |
| Tolylene diisocyanate | 2.84 |

The resulting propellant charge is then cured at 170° F. for 120 hours. The ballistic properties of the cured castable propellant are as follows:

TABLE VI

*Ballastic Properties of Cast Propellant*

| | |
|---|---|
| Specific impulse _____ sec. | 234 |
| Characteristic exhaust velocity _____ft./sec. | 4790 |
| Burning rate at 1000 p.s.i. _____in./sec. | 0.27 |
| Pressure exponent | 0.23–0.51 |
| Propellant density _____lbs./in.³ | 0.058 |
| Thrust coefficient at 1000 p.s.i. to sea level | 1.58 |

The cross-section loading of the thus-formed rocket motor is 94.9 percent and the ratio of extrudable propellant to cast propellant is 1.75 to 1. When this rocket motor is fired, with burning taking place on the surface defining the perforation, the thrust and pressure vary with time. The slivers resulting at the end of the firing of this motor amount to only 1.07 percent, while the specific impulse of this motor is 243.9 seconds.

Illustrative propellant charges of this invention are set forth in the following table, the specific impulse values of which were calculated for a rocket motor in which a ratio of 2/1 extruded propellant/cast propellant is used.

TABLE VII

| Extruded Propellant, Parts by Weight | Cast Propellant, Parts by Weight | Specific Impulse, Seconds |
|---|---|---|
| 90 ammonium perchlorate/10 rubbery binder. | 75 ammonium perchlorate/25 polysulfide rubber. | 242 |
| 90 ammonium nitrate/10 rubbery binder. | _____do_____ | 212 |
| 70 ammonium perchlorate/25 decaborane/5 rubbery binder. | _____do_____ | 261 |
| 80 ammonium perchlorate/10 aluminum/10 rubbery binder/2 catalyst. | 80 ammonium perchlorate/20 polyurethane/catalyst. | 255 |

Various modifications and alterations of this invention will become apparent to those skilled in the art without departing from the scope and spirit of this invention, and it is to be understood that the foregoing discussion and accompanying drawing merely set forth preferred and illustrative embodiments of this invention and should not unduly limit the same.

I claim:

1. A cylindrical solid propellant charge, comprising extruded solid propellant and cast solid propellant, said charge having an axial perforation extending the length thereof, said perforation having a main portion and a minor portion, said main portion of said perforation being defined by exposed surfaces of said extruded solid propellant and said minor portion of said perforation being defined by exposed surfaces of said cast solid propellant, said cast solid propellant defining the outer cylindrical surface of said charge, said extruded solid propellant comprising at least two segments partially embedded in said cast solid propellant and supported by the same, the inner surfaces of said segments forming said exposed surfaces defining in the main said perforation, and restricting material covering the outer cylindrical surfaces of said cast solid propellant and the two ends of said charge.

2. A cylindrical solid propellant charge, comprising extruded solid propellant and cast solid propellant, both of said propellants being of the composite type comprising a major amount of a solid inorganic oxidizing salt and a minor amount of a combustible binder, said charge having an axial perforation extending the length thereof, said perforation having a main portion and a minor portion, said main portion of said perforation being defined by exposed surfaces of said extruded solid propellant and said minor portion of said perforation being defined by said cast solid propellant, said extrudable solid propellant comprising at least two non-contiguous longitudinal segments partially embedded at their outer surfaces in said cast solid propellant and supported by the same, the inner surfaces of said segments forming said exposed surfaces defining said main portion of said perforation, and restricting material covering the outer cylindrical surfaces of said cast solid propellant and the two ends of said charge.

3. The solid propellant charge of claim 2, wherein said inorganic oxidizing salt is selected from the group consisting of the ammonium, alkali metal, and alkaline earth metal salts of nitric, chloric, and perchloric acids, said binder of said extruded propellant comprising a rubber, and said binder of said cast propellant comprising a polyurethane.

4. The solid propellant charge of claim 3 wherein said perforation is substantially rectangular in cross section.

5. The solid propellant charge of claim 3 wherein said perforation is substantialy star-shaped in cross section, said segments of extruded propellant are substantially diamond-shaped in cross section with the inner surfaces thereof exposed to define the inner star points of said perforation.

6. The solid propellant charge of claim 3, wherein said extruded propellant comprises a major amount of ammonium nitrate and a minor amount of a rubbery copolymer of a conjugated diene and a vinyl substituted heterocyclic nitrogen compound, and said cast propellant comprises a major amount of ammonium perchlorate and a minor amount of a polyurethane.

7. The solid propellant charge of claim 6 wherein said conjugated diene is 1,3-butadiene and said vinyl substituted heterocyclic nitrogen compound is 2-methyl-5-vinylpyridine.

8. In a rocket motor comprising a cylindrical casing defining a combustion chamber and a reaction nozzle communicating with one end thereof, a cylindrical solid propellant charge loaded in said combustion chamber, said charge comprising extruded and cast solid propellants, both of said propellants being of the composite type, said extruded propellant comprising a major amount of ammonium nitrate and a minor amount of a rubbery copolymer of a conjugated diene and a vinyl substituted heterocyclic nitrogen base compound, said cast propellant comprising a major amount of ammonium perchlorate and a minor amount of a polyurethane, said charge having an axial perforation extending the length thereof, said perforation being star-shaped in cross section, said extruded propellant comprising a plurality of circumferentially aligned, non-contiguous longitudinally extending segments, said segments being diamond-shaped in cross section, said segments having inner exposed surfaces which define in the main said perforation, said segments being partially embedded in and surrounded and supported by said cast propellant which defines the outer cylindrical surface of said charge, the outer extremities of said perforation being defined by said cast propellant, said outer cylindrical surface of said charge being bonded to the inner cylindrical wall of said casing, and restricting material bonded to the ends of said charge.

References Cited in the file of this patent
UNITED STATES PATENTS

| | | |
|---|---|---|
| 2,600,678 | O'Neill | June 17, 1952 |
| 2,628,561 | Sage et al. | Feb. 17, 1953 |
| 2,703,960 | Prentiss | Mar. 15, 1955 |
| 2,755,620 | Gillot | July 24, 1956 |
| 2,784,638 | Diels et al. | Mar. 12, 1957 |
| 2,795,990 | Bohlman et al. | June 18, 1957 |
| 2,816,418 | Loedding | Dec. 17, 1957 |
| 2,856,851 | Thomas | Oct. 21, 1958 |

OTHER REFERENCES

A Quasi-Morphological Approach to the Geometry of Charges for Solid Propellant Rockets: The Family Tree of Charge Designs, by J. M. Vogel, published in Jet Propulsion, February 1956, vol. 26, No. 2, pp. 102–105.